Figures 1, 2:
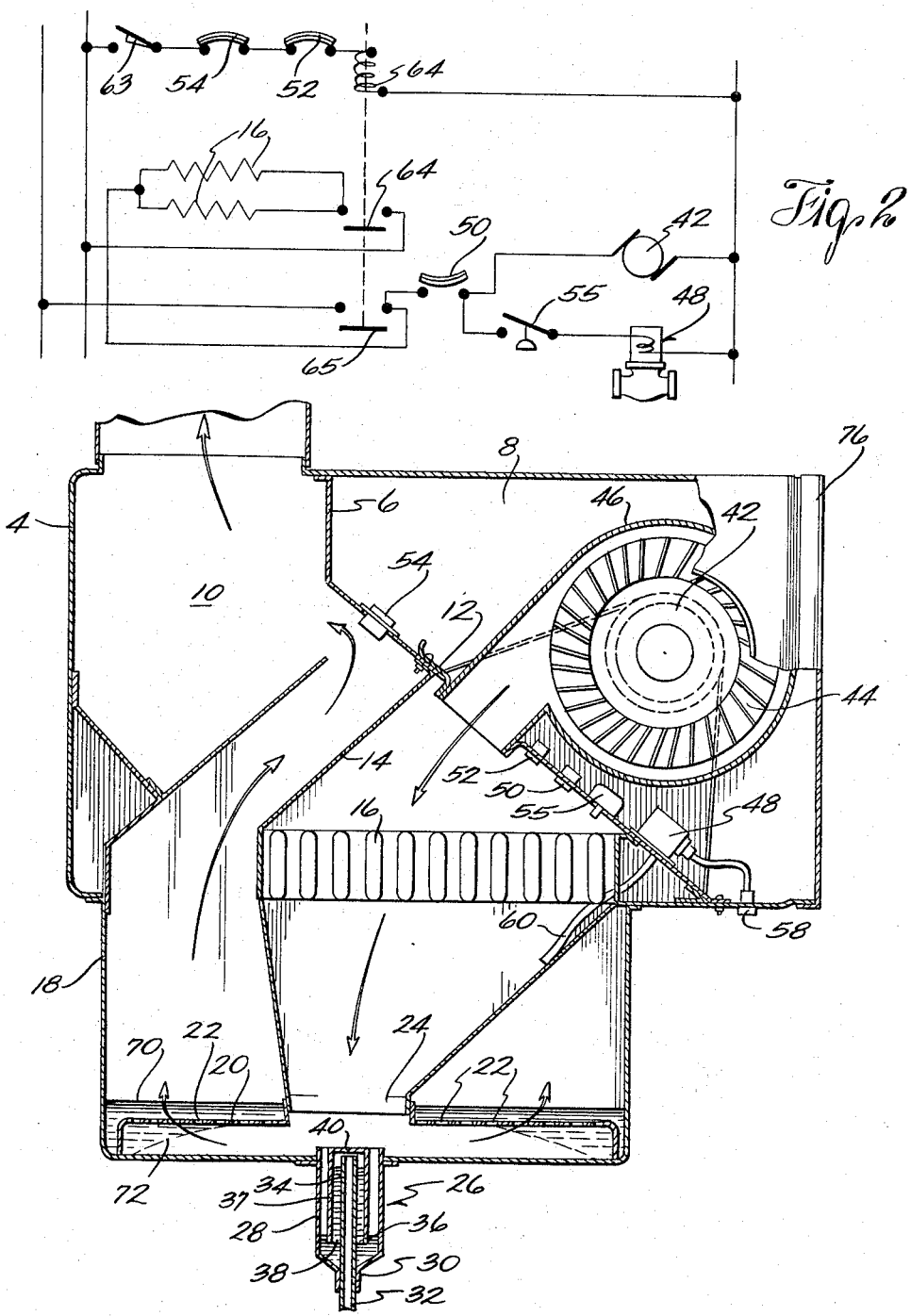

July 25, 1967 P. W. SCHIPPER 3,332,672
AUTOMATIC HUMIDIFIER WITH PERIODIC WATER REPLACEMENT
Filed May 27, 1966

Inventor
Pieter W. Schipper
By Wheeler, Wheeler & Wheeler
Attorneys

Patent Document

3,332,672
AUTOMATIC HUMIDIFIER WITH PERIODIC WATER REPLACEMENT
Pieter W. Schipper, Elm Grove, Wis., assignor to Atwater-General Corp., Watertown, Wis., a corporation of Wisconsin
Filed May 27, 1966, Ser. No. 553,374
9 Claims. (Cl. 261—129)

This invention relates to an automatic humidifier with periodic water replacement.

Air supplied, as by a blower, is forced through water in a pan to filter the air and at the same time to pick up water for humidification. The air is heated. I contemplate the use of electric heating coils, hot water or steam radiators, gas heaters, or the admission of warm air bypassed from existing furnaces or the like. By way of exemplification, electric coils are shown in the instant device as the means for heating the air.

For the purposes of this application, the thermostatically controlled blower is capable of developing substantial air pressure. To avoid lime deposits, a part of the water is drained from the pan following each cycle of operation and replaced with fresh water. Encrustation with mineral deposits is avoided by preventing undue concentration.

All or substantially all prior art humidifiers using water pans employ floats to control the level of water in the pans. Floats are a prime source of difficulty since they become encrusted with minerals and are undependable. The instant device has no float. Water level is controlled by a pressure switch which responds to back pressure on the blower as such pressure is varied by the amount of water in the water pan.

No water can discharge from the pan while the blower is in operation because the arrangement is such that the incoming air blows the water away from the pan outlet.

The construction of the disclosed embodiment is such that protection is provided to meet all reasonable conditions of failure. If, for any reason, water accumulates in the pan beyond an amount which permits of the desired operation, or, in the event of failure of the pressure switch to shut off the water, water will accumulate to a depth such as to impede air flow and the resulting rise in temperature opens a normally closed thermostat to shut off the humidifier. If this normally closed thermostat would fail to function, the excess water would flow through the drain as soon as the height of the water level exceeds the stalling pressure of the blower. In the event of blower or motor failure, a normally closed thermostat opens because the heat generated by the heating elements cannot be dissipated. In the event of heating element failure, a normally open thermostat (closed only when heat is generated in an amount sufficient to require blower operation) remains open to shut off the blower and the water supply. In the event the water valve fails to open, or the water supply fails, the temperature in the outlet duct rises above normal to open a thermostatic switch to shut down the entire humidifier.

The drain has a "gooseneck" functioning as an air trap to operate automatically without moving parts. The gooseneck is constructed to prevent siphoning. Its design is such that it never vents air from the apparatus but only drains water after each cycle as soon as the blower shuts off.

The housing is so designed that instruments such as the blower and its motor and controlling instruments are mounted on a readily removable panel so that they can be handled unitarily for access or repair. Further design features are baffles in the outlet chamber to prevent carry-over of free water droplets in the outlet air stream and an air pressure seal to keep condensation and moisture away from all pan attachment bolts, forestalling leakage.

In the drawings:
FIG. 1 is a view in transverse section through apparatus embodying the invention.
FIG. 2 is a circuit diagram.

It will be understood that all particulars as to temperatures, pressures, and dimensions hereinafter stated are by way of example and not by way of limitation. The objective in stating them is to indicate one particular organization in which the proper functioning of all elements will occur. It will be understood by those skilled in the art how changes may be made in the light of this disclosure.

The housing 4 has a partition 6 dividing it into a control instrument chamber 8 and an air outlet chamber 10. A removable panel 12 is detachably connected with partition 6 as a part thereof. Below panel 12 a duct 14 containing the heating element 16 leads downwardly into a water pan 18 supported below housing 4. Immersed in the water pan and connected with the duct 14 is a foraminous bell 20 which is provided with numerous small openings 22 affording communication from the space enclosed beneath the bell to the upper part of water pan 18, which communicates with the outlet chamber 10.

Directly beneath the throat 24 through which the duct 14 opens into the space beneath bell 20 is the automatic drain valve 26 through which water is cyclically discharged from the pan 18. The automatic drain valve includes a tube 28 having a downwardly constricted collar 30 sealed externally with the drain pipe 32. Portion 34 of drain pipe 32 extends upwardly within the tube 28 to a predetermined level which, in the instant device, is approximately three inches above the lower end of baffle 36 which has the form of an inverted cup open at its bottom end 38 and sealed at its upper end 40. These parts provide a "gooseneck" containing a three-inch column of water when full. This may be done, for example, by making the third leg sufficiently large to prevent siphoning. The height of the water column in the gooseneck is related to the particular stalling pressure of the blower and its motor as hereinafter described. In the instant device, the stalling pressure, i.e., the maximum pressure which the blower will develop at zero air delivery, is 2.5 inches of water pressure. A three-inch high water column in the gooseneck cannot be blown clear by this amount of pressure and consequently the gooseneck will develop sufficient back pressure to prevent loss of air through the otherwise open drain, when the humidifier is in operation.

Mounted on the panel 12 for unitary removal are the blower motor 42; the blower 44 and its housing 46 (the latter opening through the panel into the heating duct 14); a solenoid valve 48; a first thermostat 52 which is normally closed; a second thermostat 50 which is normally open; and a pressure responsive switch 55. A third thermostat 54 which is normally closed is mounted on partition 6 only because, in the instant device, the removable panel 12 does not extend far enough to receive it.

The solenoid valve 48 controls flow of water from the inlet pipe 58 to a duct 60 which leads from the valve into the conduit 14 at a point below the heating element 16, the water received through the valve being discharged through the throat 24 into the bottom of pan 18 below the foraminous bell 20.

The first thermostatic switch 52, normally closed, which requires resetting after it opens, is in series with the humidistat switch 63 and controls the heater relay 64. In the instant device, the first thermostatic switch 52 is set to open at 150° F. Being directly above the heating coil 16, it is sensitively responsive to any condition which fails to dissipate the heat. If this thermostat opens and the relay 64 opens, the resistance 16 will be deprived of current and all units will stay inoperative until repairs are made. The difficulty might normally be some failure of the blower or its motor, or even pressure switch 55 of solenoid valve 48.

The second thermostatic switch 50, normally open, is closed by heat from coil 16, being set to close in the instant device at 110° F. Thermostat 50 is in circuit with motor 42 and solenoid valve 48. If there is anything wrong with the coil, or its supply of energy, to prevent the temperature from rising to 110° F., the blower will not operate and the solenoid valve 48 will remain closed.

Also in series in this circuit is the third thermostat 54. This thermostat is also normally closed and it also controls the relay 64. In the instant device, it is set to open at 130° F. It is located in exhaust chamber 10. If a situation arises in which most or all of the water in the pan has been evaporated, the temperature in the exhaust duct will rise, with the result that thermostat 54 will open and the unit will shut off and remain shut off until repairs are made.

In normal operation, water admitted through the solenoid valve 48 will fill the pan 18 approximately to the level indicated at 70. The water does not drain out because, due to the specific configuration, the air forms a cushion at the center of the pan, blowing the water to the periphery, away from the drain inlet. Although the drain is "open" air cannot escape because the air pressure is too low to overcome the back pressure of the column of water in the gooseneck or trap provided between the inverted cup 37 and the upper end 34 of the drain pipe 32.

When the humidistat switch 63 is closed, current can flow through the normally closed thermostatic switches 54 and 52. This will hold the normally open relay switch 64 energized to admit current to the heating coils 16. It will be understood that the heating means is illustrated to comprise electrical elements because these can be conveniently diagrammed. The relay 64 also controls by reason of its normally open contact 65 the flow of current to the normally open switch 50. When the relay valve contact 65 is closed, a rise in temperature produced by the operation of the heating element 16 will reach a sufficient value to close the normally open thermostatic switch 50. Current then can flow through such switch to the fan motor 42 and fan operation commences.

The operation of the fan forces air through the heating coils 16 under sufficient pressure to cause air to be discharged in the form of small bubbles through the multiplicity of small openings 22 in the foraminous bell 20. The water beneath the bell will tend to be forced away from the center of the pan and away from the drain to assume the inter-face position shown at 72 in FIG. 1. From this interface, air will be continually escaping upwardly and replaced by additional air delivered by the fan. In traversing the water, the air bubbles will very efficiently pick up moisture to effect the humidification for which the device is intended.

As long as there is adequate back pressure, resulting from an adequate supply of water in the pan 18, the pressure sensitive switch 55 will remain open, thus leaving the solenoid water valve 48 closed. Whenever the amount of water in the pan becomes inadequate, the pressure sensitive switch 55 will close and this will open the solenoid valve 48 to admit more water. On the other hand, if the supply of water becomes excessive so that the air cannot force its way through water as above described, the heat from the coils 16 will no longer be carried off properly and the rise in temperature will cause the opening of the thermostatic switch 52. Thereupon, relay 64 will open to shut off the heat and the blower and the water.

At the conclusion of a cycle, whether by the opening of the humidistat switch 63 or otherwise, the water displaced from the center of the pan 18 will flow back over the drain inlet and through the gooseneck until the pan has been drained of water down to the level of the drain inlet rim.

This is important because the humidifier as shown is capable of evaporating a gallon of water per hour and the concentration of mineral deposits which could be left within the apparatus if this rate of evaporation were continued indefinitely would soon render the device inoperative. By draining the pan at the conclusion of each cycle, undue concentration of foreign matter is precluded and, in effect, the device starts each cycle with a substantial portion of fresh water.

By reason of the arrangement which precludes concentrations of foreign matter and by virtue of the fact that float valves are dispensed with and the proper water level obtained by the combination of a pressure blower and a pressure sensitive switch, the device as disclosed is particularly adapted for long periods of trouble free operation. Moreover, as above explained, if failure of any part occurs, the device will automatically shut itself off until the needed repairs are made. The mounting of most of the electrical parts upon a single readily removable panel is advantageous in facilitating such repairs as may be necessary. This panel is readily accessible upon removal of the end plate 76.

One of the advantages inherent in the construction disclosed consists in the provision of an internal air seal that tends to prevent moisture from reaching the roots of the pan positioning bolts. These bolts are anchored in an internal zone in which dry air exists at super-atmospheric pressure. The humidified air is at atmospheric pressure and thus is substantially eliminated from this critical leakage-prone location.

It will be noted that there are no parts on which lime or other salts accumulate in operation.

Replacement of relatively concentrated water with fresh make-up water following each cycle tends to prevent accumulations of water-borne salts in the pan.

The fact that the device functions by blowing air through the water means that pads, belts, wicks and other water-bearing devices commonly used in humidifiers are all eliminated. Since the air is preliminarily heated, the device is free of deposits of lime such as accumulate on heating coils or heating elements placed in the water in some humidifiers.

Since air pressures are used as a means of sensing water levels, it is unnecessary to use floats or other comparable mechanical or electrical water-actuated devices for this purpose. Since the drain is open, with an air cushion substituted for a valve, I eliminate mechanically or electrically operated drain valves which have been costly and a source of trouble in previous humidifiers.

The result is to do away with annoying maintenance problems heretofore experienced.

The filtering of the air by passing it through the water is a significant secondary advantage.

It is also advantageous to use the stall pressure of the blower as a basis for the fail-safe features above outlined.

I claim:

1. In a humidifier, the combination of a water pan, means for forcing air through the water in said pan for the humidification of such air, means for admitting water to said pan for replacement of water evaporated by said air, and means for controlling water admission including a pressure switch exposed to the air between the said forcing means and the water pan.

2. A humidifier according to claim 1 including means for shutting off the air forcing means to close a cycle of operation of the humidifier, and means effective upon the closing of such cycle to drain from said pan water concentrated by evaporation.

3. A humidifier according to claim 2 in which the means for draining concentrated water from the pan is a device for discharge flow including a water trap having means including a trap portion in which water accumulates to create a back pressure in excess of that normally developed by said air forcing means but less than sufficient to resist discharge flow when the water trap is subject to pressure of water which stands in said pan, said air forcing means including an air blast nozzle which displaces water away from said water trap during operation of said air forcing means.

4. In a humidifier, the combination of means for delivering air under pressure, means for heating the air so delivered, a water pan in which water normally stands at predetermined depth, means whereby air delivered under pressure is discharged below water level when the water stands at predetermined depth in said pan, the passage of air through said water causing the humidification of such air, a discharge port leading from said pan and provided with a water trap in which flow can be initiated by water standing at said depth, and means for concentrating against said discharge port the air delivered by said pressure delivering means, whereby to blow water away from said discharge port to reduce water over said water trap when the means for delivering air under pressure is in operation, cessation of operation of said air delivering means allowing water to flow back over said discharge port and thereby to initiate drain operation for the discharge of water from said pan.

5. A humidifier according to claim 4 in which a normally closed pressure switch is exposed to pressure of air between said air delivering means and said pan, a solenoid valve having water supply and water delivering connections and having its solenoid electrically connected in series with said pressure switch, the water delivering connection leading from said valve to said pan for delivering water to said pan when the pressure switch is closed, said switch being set to open responsive to back pressure of said air to which it is exposed whenever the water in said pan reaches predetermined depth, whereby said pressure switch controls water level.

6. In a humidifier, the combination with a casing having air inlet and air discharge chambers and an intervening partition, a pressure blower having an operating motor and arranged for delivery of air from the inlet chamber toward the discharge chamber, a conduit with which the blower communicates and which leads toward the bottom of the discharge chamber, a pan in the bottom of the discharge chamber in which water normally stands at predetermined depth, said conduit terminating below the surface of water at said depth, a foraminous inverted bell having numerous openings below water level and positioned to receive air from said conduit, the air issuing in the form of bubbles through said openings and rising in said water for humidification and discharge from the discharge chamber, means for admitting water to said chamber, and means controlled by back pressure in said conduit for regulating the operation of the water admitting means.

7. In a humidifier according to claim 6, means for heating air caused by said blower to traverse said conduit, a normally open thermostatic switch exposed to air in said conduit and in series with the back-pressure-controlled means for rendering said water admitting means operative only when the air in said conduit is adequately heated.

8. In a humidifier according to claim 6, means for heating air caused by said blower to traverse said conduit, a normally open thermostatic switch exposed to air in said conduit and in series with the water admitting means for rendering said water admitting means operative only when the air in said conduit is adequately heated, a second thermostatic switch normally closed and in series with the first mentioned switch and the blower motor and the water admitting means and adapted to open to interrupt the operation of the blower and the water admitting means when the temperature of air traversing the humidifier becomes extensive.

9. A humidifier according to claim 6 in which the water pan is provided immediately beneath the conduit with a drain that includes a water trap adapted to retain a head of water in excess of the head of air pressure developed by said blower, said blower and said conduit constituting means whereby the water of the pan is blown away from said drain when the blower is in operation, the water accumulating in the pan when the blower is not in operation being adapted to overcome the head of water in the trap to initiate drainage of water from said pan when blower operation ceases.

References Cited
UNITED STATES PATENTS

| | | | |
|---|---|---|---|
| 1,943,297 | 1/1934 | Cook | 55—225 |
| 2,212,418 | 8/1940 | Hamann | 261—124 X |
| 2,828,761 | 4/1958 | Weibert. | |
| 3,215,416 | 11/1965 | Liben | 219—272 X |

FOREIGN PATENTS

| | | |
|---|---|---|
| 166,982 | 7/1921 | Great Britain. |

HARRY B. THORNTON, *Primary Examiner.*

R. R. WEAVER, *Assistant Examiner.*